March 2, 1926.  
D. WITBECK  
1,575,243
AUTOMOBILE RUNNING BOARD TRUNK
Filed March 2, 1925
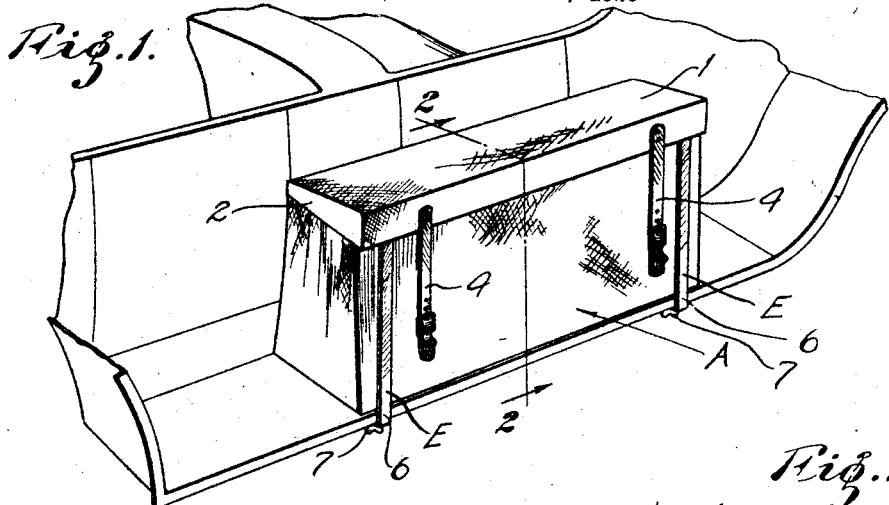
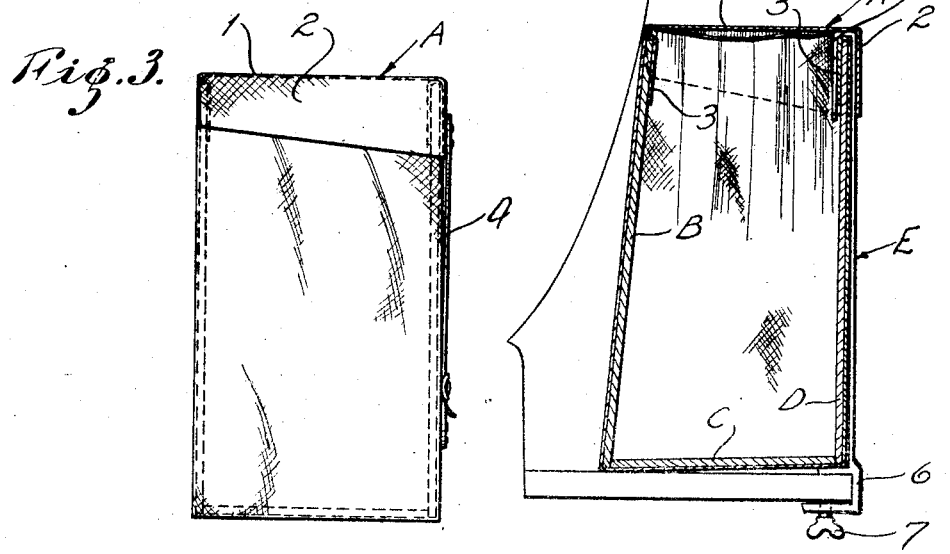
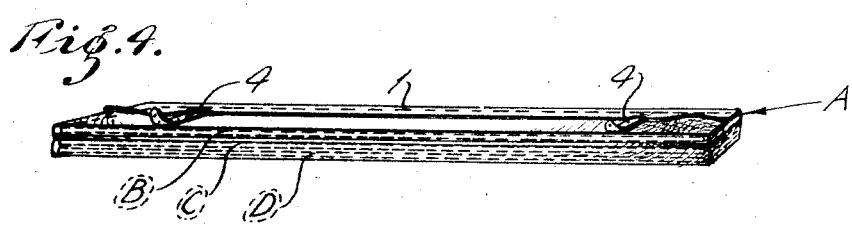
INVENTOR.  
DESFORD WITBECK  
By Bakewell & Church  
ATTORNEYS.

Patented Mar. 2, 1926.

1,575,243

UNITED STATES PATENT OFFICE.

DESFORD WITBECK, OF ST. LOUIS, MISSOURI.

AUTOMOBILE RUNNING-BOARD TRUNK.

Application filed March 2, 1925. Serial No. 12,685.

*To all whom it may concern:*

Be it known that I, DESFORD WITBECK, a citizen of the United States, residing at St. Louis, Missouri, have invented a certain new and useful Improvement in Automobile Running-Board Trunks, of which the following is a full, clear, and exact description, such as will enable others skilled in the art to which it appertains to make and use the same.

This invention relates to trunks of the kind that are used on the running boards of automobiles.

The object of the invention is to provide an inexpensive running board trunk of attractive appearance that can be used with automobile bodies whose side walls either extend flush with the running board or overhang the running board, and which is constructed in such a manner that it can be collapsed and stored under one of the seats of the body when not in use.

To this end I have devised a running board trunk that consists of a casing constructed of artificial leather or other flexible fabric, and a number of rigid wall members inside of said casing designed so that they can be arranged in such relation that they form a rigid bottom, a rigid front wall and a rigid rear wall, thus holding the casing taut and giving the trunk the same general appearance as the conventional running board trunk, which, as is well known, is constructed in the form of a rigid, non-collapsible structure. Said front and rear wall members are held in spaced relation preferably by the bottom member, and when it is desired to remove the trunk from the running board and store it away, this can be done simply by disengaging the co-operating wall members inside of the casing, arranging them in super-imposed relation, one upon the other, and then folding the casing so as to produce a flat bundle that is small enough to be stored in a compartment under the seat of an automobile body. The portions of the casing that constitute the end walls of the trunk are not supported or sustained in any way, and in view of the fact that the rear wall member is held spaced away from the front wall member by the bottom member of the trunk, said rear wall member is free to rock forwardly more or less in instances where the side wall of the automobile body overhangs or projects laterally over the running board. Consequently, my improved trunk will automatically adapt itself to various kinds of automobile bodies, namely, automobile bodies in which the sides extend flush with the splash pans at the inner sides of the running boards, or bodies whose side walls overhang or project laterally beyond the running boards.

Figure 1 of the drawings is a perspective view of a portion of an automobile, illustrating a trunk constructed in accordance with my invention, mounted on one of the running boards of the automobile.

Figure 2 is a vertical transverse sectional view of said trunk, taken on the line 2—2 of Figure 1.

Figure 3 is an end view of the trunk; and

Figure 4 illustrates the trunk collapsed and ready to be stored away.

Referring to the drawings which illustrate the preferred form of my invention, A designates a casing made of artificial leather or other suitable fabric and constructed so as to form a lid or top 1 provided with a depending flange 2, and a body portion comprising a bottom, end walls and a front and rear wall. Rigid wall members B, C and D are arranged inside of the casing A so as to hold the front and rear walls of the casing in an upright position when the trunk is in use, and thus give the trunk the same general appearance as the conventional automobile running board trunk. Preferably, the rigid wall members B, C and D are so designed that the member C which constitutes the bottom of the trunk can be arranged between the members D and B which constitute the front and rear walls of the trunk, so as to hold the same in spaced relation at the lower end of the trunk, as shown in Figure 2. The front and rear wall members D and B are preferably either connected to the front and rear wall portions of the casing A or are arranged with their upper edge portions projecting into pockets 3 that extend longitudinally of these portions of the casing on the inside of same, as shown in Figure 3. The lid or top 1 of the casing is adapted to be drawn down taut over the top edge of the front wall member D by straps 4 or any other suitable means. Usually, no means is provided for supporting the flexible end walls of the casing A, as supporting devices for these portions of the casing are not absolutely essential. However, if desired, rigid wall members may be arranged inside of the casing to support the end wall portions of the same.

The trunk can be retained in operative position on the running board in various ways without departing from the spirit of my invention. Usually, each trunk will be equipped with two holding members E, each of which consists of a flat metal bar provided at its upper end with a hook-shaped portion 5 that is adapted to engage the top edge of the front wall of the trunk and provided at its lower end with a substantially channel-shaped portion 6 that is adapted to be slipped over the outer edge of the running board, as shown in Figure 2, said channel-shaped portion being equipped with a clamping device 7 that is adapted to be manipulated so as to cause the member E to draw the trunk downwardly into snug engagement with the running board.

When the trunk is arranged in operative position on the running board of an automobile, the rigid bottom member C inside of the casing A holds the lower end portions of the front and rear wall members D and B, respectively, in spaced relation, and as said wall members D and B are secured to the corresponding portions of the casing A, they hold the same in a taut condition, and thus give the trunk the same general appearance as the conventional running board trunk. After the trunk has been packed the lid or top 1 is drawn down over the top edge of the rigid front wall of the trunk and secured in position by straps 4, or any other suitable means. The upper end portion of the rear wall B of the trunk is free to move towards and away from the front wall D sufficiently to adapt the trunk to an automobile body whose side walls project laterally or overhang the running boards, and if it is desired to remove the trunk from the running board and store it away, this can be accomplished simply by disengaging the holding members E from the trunk and from the running board, then disengaging the rigid bottom member C from the rigid vertical wall members B and D and thereafter arranging the members B, C and D in superimposed relation, one upon the other, which operation causes the trunk to be collapsed or folded into a compact bundle, as shown in Figure 4, that is small enough to permit it to be stored under one of the seats of the automobile body.

Having thus described my invention, what I claim and desire to secure by Letters Patent is:

1. A collapsible running board trunk, comprising a casing constructed of fabric or other suitable material, rigid front and rear wall members arranged inside of the casing and connected at their upper ends to the front and rear wall portions of the casing, and a rigid bottom member interposed between said front and rear wall members and adapted to be disengaged from same and arranged in superimposed relation with said members when it is desired to collapse the trunk.

2. A running board trunk for automobiles, comprising a casing formed of fabric or the like, and rigid front and rear wall members and a bottom member arranged inside of said casing and combined in such a way that the upper end portion of the rear wall member is free to move towards and away from the front wall member and thus adapt the trunk to automobile bodies of various kinds.

3. An automobile running board trunk, composed of a casing constructed of fabric or the like and comprising a lid and a body portion, rigid front and rear wall members arranged inside of said body portion with their upper edge portions positioned in pockets on the front and rear wall portions of the casing, and a rigid bottom member removably mounted between said front and rear wall members.

4. A running board trunk for automobiles provided with a rigid front wall, a rigid bottom, flexible end walls, and a rigid rear wall whose upper edge portion is free to swing towards and away from said front wall.

5. A running board trunk for automobiles provided with a rigid front wall, a rigid bottom, flexible end walls, a rigid rear wall whose upper edge portion is free to swing towards and away from said front wall, a flexible lid, and means for drawing said lid taut over the top edge of the rigid front wall of the trunk.

DESFORD WITBECK.